CLAMPED VIDEO DROPOUT COMPENSATOR

Filed June 23, 1965

WILLIAM F. BOYLAN
LEONARD KOWAL
INVENTORS

BY Anderson, Luedeka, Fitch, Even & Tabin
ATTORNEYS 3,408,457
CLAMPED VIDEO DROPOUT COMPENSATOR
William F. Boylan, Morton Grove, and Leonard Kowal, Chicago, Ill., assignors to Ampex Corporation, Redwood City, Calif., a corporation of California
Filed June 23, 1965, Ser. No. 466,297
5 Claims. (Cl. 178—6.6)

ABSTRACT OF THE DISCLOSURE

A clamp circuit is provided to prevent dropout-induced instability in a picture produced by a video tape recorder. A dropout detector responds to the reproduced signal from the recorder to produce dropout pulses of time and duration corresponding to intervals where the recorded signal is not reproduced. The dropout pulses are then used to clamp the demodulated reproduced signal to a reference level for the duration of the dropout to prevent its triggering the vertical deflection circuit of the picture reproducing apparatus. Preferably the reference level is at the grey level of the picture and is displaced from the blanking level in a direction opposite from vertical synchronizing pulses.

Figures 1, 2A, 2B:
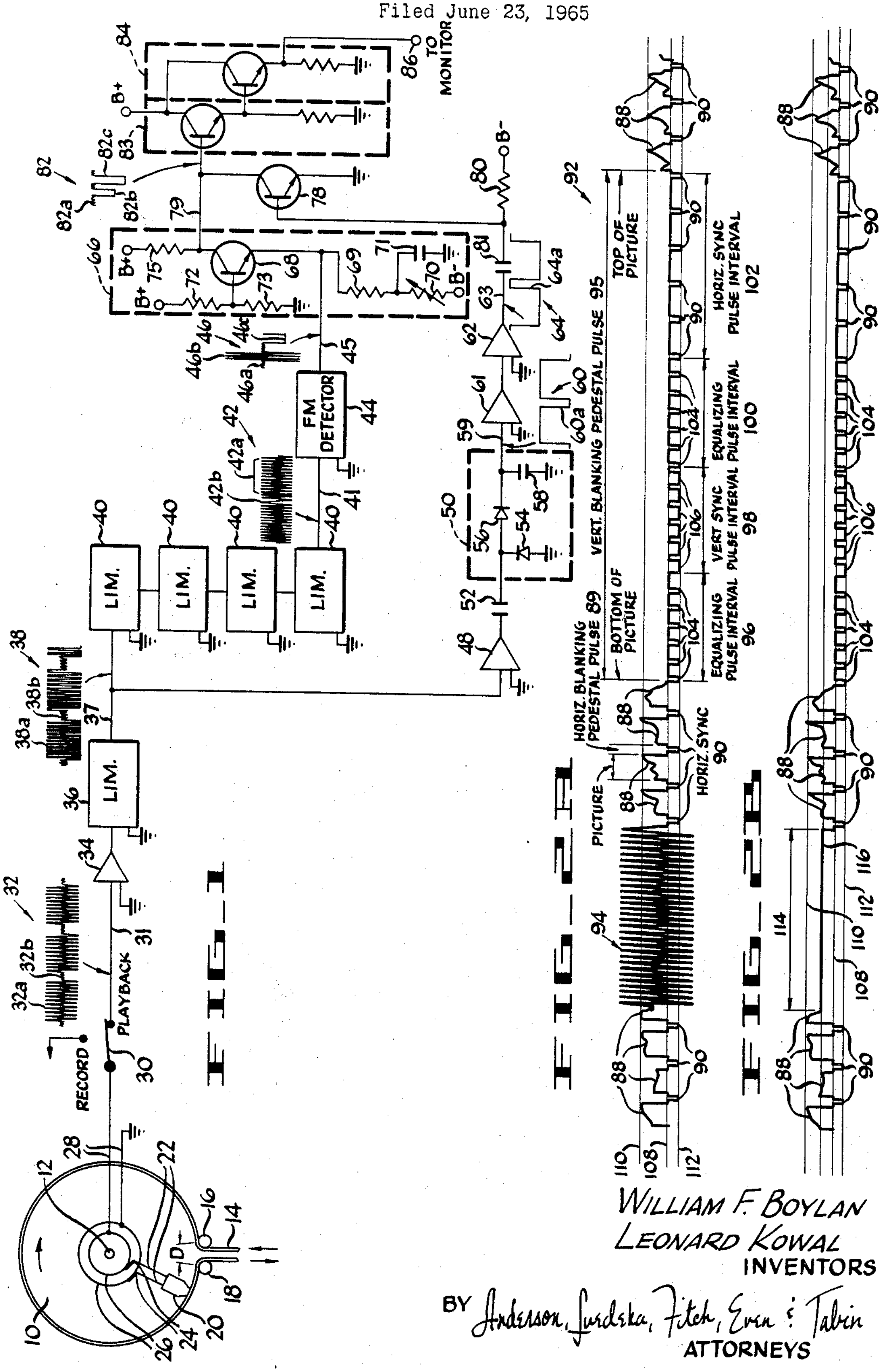

This invention relates to a video tape recorder and more particularly to a circuit for preventing vertical picture instability as occasioned by dropout, i.e., the loss of signal during reproduction as caused by failure of the transducer to contact the tape. More particularly this invention relates to a clamp circuit for clamping the composite picture signal at a fixed level above the video black level during such dropout to prevent vertical instability in the picture.

In various forms of video tape recorders there is a certain portion of the recording or reproducing cycle during which the transducer head is out of contact with the magnetic tape upon which the video signal is to be recorded or from which it is to be reproduced. Such conditions obtain in the case of tape recorders utilizing the so-called omega wrap, where the tape follows a helical path extending almost but not quite 360° around a rotating transducer head drum, being called an omega wrap because the tape path resembles a Greek capital omega. The failure to close the loop leaves a gap in the tape path where the rotating transducer head cannot touch the tape. During the recording mode this results in the failure of a certain amount of the incoming signal to be recorded. In the reproducing or playback mode, this results in a portion of the cycle during which the transducer head picks up no signal.

The present invention is concerned with the playback mode of an FM video tape recorder. Although the transducer head picks up no signal during the dropout interval, this absence of picked up signal does not mean that there is zero voltage level during this interval. In fact, there is a certain amount of noise present which, during processing of the information signal, becomes very large relative to the information signal, and because of its random frequencies, is not removed during the demodulation of the information signal. In fact, the FM demodulation process itself increases the dropout noise relative to the composite picture signal. In certain recorder systems the dropout becomes particularly troublesome as the vertical synchronizing circuit of the picture reproducing apparatus of a television set or a monitor may mistake this noise for the vertical synchronizing interval, thus causing the vertical sweep or deflecting circuit for the picture tube of the picture reproducing apparatus to return the electron beam prematurely to the top of the picture and producing vertical instability in the resultant picture. More particularly, this instability or "jitter" may occur where the dropout occurs shortly before the vertical synchronizing interval.

The dropout interval is inevitable with any recorder where the only transducer head leaves the tape during part of its cycle. In some circuits of the prior art, the dropout was caused to occur during the vertical interval; this avoided losing any of the picture information but required sophisticated circuitry to avoid losing horizontal synchronization for a time. The dropout is therefore preferably made to occur just prior to the vertical interval in each video field in order that the resulting blank region on the reproduced picture be relatively inconspicuous. This may be achieved by appropriate synchronization and is not itself part of the present invention. The present invention relates to a circuit for preventing dropout-induced vertical instability from triggering of the vertical sweep circuit.

In accordance with the present invention, the dropout is itself detected by noting its position in the reproduced signal prior to the processing and demodulation of the signal. The dropout detector is responsive to the dropouts by producing control pulses indicative of such dropouts. After the processing and demodulation of the reproduced composite picture signal, which will include the dropout noise, the control pulses are used to clamp the demodulated signal to a fixed level during the dropout interval, thus eliminating the dropout noise from the composite picture signal. This fixed level is above that level which triggers the vertical deflection circuit, thus the vertical deflecting circuit will not prematurely return the electron beam to the top of the picture.

Thus, the primary object of the present invention is to prevent vertical instability in the resulting picture from being caused by the dropout in the signal reproduced by a video tape recorder. Another object of the present invention is to clamp the reproduced signal to a neutral value during the dropout interval to prevent premature triggering of the vertical deflecting circuit by the dropout noise. Other objects and advantages of the present invention will become apparent from the following description taken in conjunction with the appended drawings, in which:

FIGURE 1 is a diagrammatic illustration of a preferred form of the clamp circuit of the present invention; and FIGURES 2A and 2B are illustrations of the waveforms developed by utilization of the clamp circuit of the present invention.

In FIGURE 1 there is shown diagrammatically certain mechanical parts of a tape recorder in which the present invention is useful. The recorder includes a transducer head drum 10 mounted for rotation on a shaft 12. Magnetic tape 14 is caused to travel a path about the head drum by means including guides 16 and 18. As illustrated, this path is helical and in the form of an omega wrap. As illustrated, the head drum rotates in a direction opposite the direction of the tape movement. The transducing head 20 is rigidly mounted to the head drum for rotation therewith. The transducing head makes contact with the tape 14 and records signals thereon or reproduces signals therefrom depending upon whether the recorder is in its recording or reproducing mode. These signals are applied to or received from the transducing head by way of conductors 22, brushes 24, and slip rings 26, the latter being connected by conductors 28 to a switch 30. The switch 30 has two positions, record and playback. Inasmuch as the present invention relates to the playback mode, the switch is shown in its playback position. The circuitry for the record mode is not shown as it plays no part in the present invention.

As is evident from the drawing, the head 20 is out of contact with the tape 14 during an interval D, the dropout interval. This interval includes the space between the guides 16 and 18 and the distance beyond until the head can strike the tape. By appropriate synchronizing and phase locking circuits, this dropout interval may be caused to occur in the video cycle just prior to the vertical synchronizing interval. As an example and for the purpose of describing the present invention, the invention will be considered as applied to a recorder wherein one complete video field is recorded during each rotation of the head drum 10, with the vertical synchronizing interval occuring shortly after the dropout signal, in approximately the position of head 20 as shown in FIGURE 1. In accordance with American television standards, there are 60 video fields produced each second; hence the period of the head drum is made 16.6 milliseconds, and the dropout pulses occur each 16.6 milliseconds.

The reproduced signal is applied through the switch 30 to a conductor 31. The nature of the reproduced signal on conductor 31 is illustrated very generally by wave form 32. This signal includes frequency modulated composite picture signal portions **32*a* and dropout portions 32*b*. The dropout portions occur each 16.6 milliseconds. The signal is applied to a preamplifier 34 which amplifies the signal shown at 32, but leaves it in substantially the same form. The amplified signal is then applied to a limiter 36 which serves to clip off the peaks of the waves and produces a limited signal on conductor 37 having a wave form 38 with a substantially square-shaped envelope. (As used herein, "square wave" and "square-shaped" do not imply a wave of equal positive and negative portions, but merely waves with very fast rise and fall times.) This wave form 38 likewise includes frequency modulated composite picture signal portions 38*a* and dropout portions 38*b*. Because of the amplification and the clipping, the noise in the dropout portion 38*b* is relatively somewhat larger than in the case of the signal shown by wave form 32**.

From the limiter 36 the signal is applied to the usual video processing circuitry which may include a plurality of limiter-amplifiers 40, wherein the signal is further emplified and clipped. After such amplifying and clipping the dropout portions have the same amplitude as the composite picture signal portions, the signal appearing on a conductor 41 substantially as illustrated as wave form 42 which includes frequency modulated composite picture signal portions **42*a* and dropout portions 42*b*. This signal is applied to an FM detector 44 which demodulates the signal to recover the original composite picture signal on conductor 45 as illustrated by wave form 46. As shown, this demodulated signal includes a picture signal portion 46*a* (including horizontal synchronizing pulses), a dropout portion 46*b* and a vertical synchronizing portion 46*c***. Because of the previous amplifying and clipping, the noise in the dropout portion has become the part of the demodulated signal having the greatest amplitude.

As will be subsequently explained, the large negative swings in the noise contained in the dropout portion may trigger the vertical deflecting circuit prematurely, if it is permitted to enter the television monitor along with the picture signal and the synchronizing pulses. To prevent this, the circuit of the present invention clamps the demodulated signal during the dropout interval to a potential well above the signal level of the vertical interval.

The circuit of the present invention takes the signal shown at 38 and amplifies it by a linear amplifier 48 to produce an amplified signal of the same character as wave form 38. The signal is then applied to a detector 50 through a coupling capacitor 52. The detector 50 includes a pair of diodes 54 and 56 which produce a signal on a capacitor 58 which follows the envelope of the signal of wave form 38 to produce a signal on a conductor 59 having the wave form illustrated at 60. This signal comprises pulses **60*a* representative of the dropout interval, each pulse lasting for the duration of a respective dropout interval. These signals are then applied to an amplifier 61, which may be an emitter follower, and then applied to an amplifier 62 which acts to invert the pulses 60*a* to produce related positive pulses on output lead 63 as illustrated in wave form 64 where a pulse 64*a*** occurs each cycle for the duration of the dropout interval. These pulses are used to clamp the composite picture signal to a desired level during the dropout interval.

The demodulated composite picture signal on conductor 45 is applied to an amplifier 66. In the particular amplifier illustrated, the signal is applied to the emitter of a transistor 68, the emitter being connected to $B^-$ through a fixed resistor 69 in series with a variable resistor 70. The resistor 69 isolates the signal from ground, although the variable resistor is by-passed to ground through a capacitor 71. Bias is applied to the base from the junction of resistors 72 and 73 which are connected in series between $B^+$ and ground. The output of amplifier 66 appears at the collector of transistor 68 which is connected to $B^+$ through a resistor 75.

A clamp circuit is provided to clamp the noise to a reference potential. The clamp circuit preferably comprises a transistor 78 having its collector connected by a conductor 79 to the collector of the transistor 68 and having its emitter connected to a reference potential, preferably ground, as illustrated. The transistor is normally held nonconducting by the bias supplied to the base from $B^-$ through a resistor 80. The dropout signal pulses **64*a* are applied from lead 63 through a coupling capacitor 81 to the base of the clamp-transistor 78. These positive pulses cause the clamp-transistor 78 to conduct for the duration of each dropout signal pulse 64*a*, thereby clamping the collector of transistor 68 to the ground reference potential for the duration of this dropout pulse. Inasmuch as the dropout pulses 64*a* coincide with the dropout portion 46*b* of wave form 46, the noise contained in this section is shunted to ground during the dropout interval, thus making the signal on conductor 79** free of such noise during this interval.

The resistance of resistor 70 determines the bias on the emitter of transistor 68 and hence determines the DC level of the amplified signal appearing on the conductor 79. This resistor is adjusted to place the zero or ground level of the signal somewhat above the black level in the vertical synchronizing interval in order that the clamped interval not be confused with the vertical synchronizing interval, as will be explained further below. Preferably, this zero level is made in the grey region. The signal appearing on conductor 79 therefore has the wave form illustrated at 82.

The signal of wave form 82 includes a picture signal portion **82*a* (including horizontal synchronizing pulses), a dropout portion 82*b* clamped to zero volts and a vertical synchronizing portion 82*c* which is more negative than the dropout portion. The signal on conductor 79 is applied through emitter followers 83 and 84 to produce a signal of similar wave form at terminal 86**. This signal is applied to the video amplifier of a picture reproducing apparatus such as a television set or a monitor whence it is processed in a conventional manner to derive the desired picture. To this end, the horizontal and vertical synchronizing signals may be separated and applied to the horizontal and vertical deflecting circuits for the picture tube, and the picture signal may be processed to control the intensity of the electron beam, all in a conventional manner.

For a more complete understanding of the operation of the present invention, wave forms are presented in greater detail in FIGURE 2. In this figure, the signals have been expanded to show the various parts of the signals at respective places in the circuit. In FIGURE 2A is illustarted the signal as it appears on conductor 45, shown in FIGURE 1 as wave form 46. The wave form as illustrated is in accordance with American standards. The wave form includes picture portions 88 providing the luminance signal, horizontal blanking pulses 89, horizontal synchronizing pulses 90 and a vertical synchronizing portion 92 as well as the noise in the dropout portion 94.

The vertical synchronizing portion includes a vertical blanking pulse or pedestal 95 which encompasses a first equalizing pulse interval 96, a vertical synchronizing pulse interval 98, a second equalizing pulse interval 100 and a horizontal synchronizing pulse interval 102. Equalizing pulses 104 occur during the equalizing pulse intervals 96 and 100; these occur twice as often as the horizontal synchronizing pulses 90 and are not as long. Vertical synchronizing pulses 106 occur during the vertical synchronizing pulse interval 98, occurring at the same rate as the equalizing pulses 104 but with a duration much longer than either the equalizing pulses 104 or the horizontal synchronizing pulses 90. These pulses extend from a reference level known as the blanking level 108. This blanking level 108 may be at or about the black level of the picture signal 88, i.e., the level of the picture signal in the blackest part of the picture. The level of the picture signal in the whitest part of the picture is the white level indicated at 110. Since the pulses 90, 104 and 106 extend from the black level in a direction away from white, the level 112 to which they extend is known as blacker than black.

The manner in which conventionl television sets synchronize their vertical deflecting circuits is with a circuit sensitive to that part of the signals more negative than the blanking level 108. The picture reproducing circuitry conventionally includes an integrating circuit responsive to blacker than black signals. This circuit produces a vertical synchronizing pulse to trigger the vertical deflection circuit when the integrating circuit receives a predetermined amount of blacker than black signals within a predetermined interval of time. The horizontal synchronizing pulses and the equalizing pulses do not trigger the vertical deflecting circuit because of their short duration. However, when the longer pulses 106 arrive, sufficient potential is developed by the integrating circuit to product a pulse to trigger the vertical deflecting circuit. As may be apparent from FIGURE 2A, the noise in the dropout region 94 includes many components more negative than the blanking level 108. These may therefore trigger the vertical deflecting circuit erroneously.

In FIGURE 2B, there is shown this same demodulated composite picture signal as it appears on conductor 79 when the signal is clamped to ground during the dropout portion. FIGURE 2B in thus an expanded version of the signal of wave form 81. This wave form includes the same picture signal portions 88, the same synchronizing signal pulses 90 and the same vertical synchronizing portion 92 as the respective portions of the wave from shown in FIGURE 2A. However, the signal is clamped to zero volts during the dropout interval to produce a clamped zero voltage dropout portion 114, where the signal is clamped to the reference potential level 116.

As noted above, the clamp-transistor 78 operates during the dropout interval to clamp the potential of conductor 79 to a reference potential level, which level is ground or zero voltage level 116 in the particular exemplary circuit shown and described. Also as above noted, the level of the signal on conductor 79 relative to ground is controlled by the adjustment of variable resistor 70. By adjustment of this resistor 70, the signal level relative to ground is adjusted to place the ground level a substantial distance above the blanking or black level 108, preferably at a grey level substantially below the white level 110. With the dropout portion of the demodulated composite picture signal clamped at a grey level, there is no dropout signal to trigger the vertical deflection circuit prematurely, and there is thus no dropout-induced vertical instability in the resultant picture.

There has thus been described a preferred embodiment of the present invention. Various modifications may be made therein without departing from the scope of the invention. For example, the same principles apply to clamp circuits for preventing dropout instability in other types of video recorder and in video signals developed under other standards. The invention is limited only by the claims.

We claim:

1. In a video tape recorder wherein a reproducing head traverses a record tape and from time to time fails to reproduce a recorded signal thereby producing dropout portions in the reproduced signal, wherein the reproduced signal is a frequency modulated composite picture signal and wherein the reproduced signal is demodulated to recover the composite picture signal including the picture signal, horizontal synchronizing pulses, and vertical intervals including vertical synchronizing pulses extending from a blanking level for triggering a vertical deflecting circuit in a picture reproducing apparatus: a clamp circuit for preventing dropout-induced triggering of the vertical deflecting circuit which would result in vertical instability in the resultant picture, said clamp circuit comprising a dropout detector responsive to the reproduced signal to produce dropout pulses of time and duration corresponding to respective dropout portions, and means coupled to said dropout detector and responsive to said dropout pulses for clamping the demodulated signal to a reference level for the duration of each of said dropout pulses, said reference level being displaced from said blanking level in a direction opposite from said vertical synchronizing pulses, whereby the dropout portion of the reproduced signal does not trigger the vertical deflecting circuit.

2. In a video tape recorder wherein a reproducing head traverses a record tape and from time to time fails to reproduce a recorded signal thereby producing dropout portions in the reproduced signal, wherein the reproduced signal is a frequency modulated composite picture signal and wherein the reproduced signal is demodulated to produce on a conductor the composite picture signal including the picture signal, horizontal synchronizing pulses, and vertical intervals including vertical synchronizing pulses extending from a blanking level for triggering a vertical deflecting circuit in a picture reproducing apparatus: a clamp circuit for preventing dropout-induced triggering of the vertical deflecting circuit which would result in vertical instability in the resultant picture, said clamp circuit comprising means coupled to said reproducing head for clipping the composite picture signal portions of the reproduced signal thereby producing a clipped signal having a square wave envelope with portions at the level of said clipping alternating with dropout portions at a relatively lower voltage level, dropout detection means responsive to the clipped signal to produce a square wave signal corresponding to said square wave envelope, switching means coupled between said conductor and a reference datum and operating when closed to connect said conductor to said reference datum, said switching means including operating means coupled to said dropout detection means and responsive to said square wave signal to close said switching means for the duration of each dropout portion, the potential of said reference datum being displaced from said blanking level in a direction opposite from said vertical synchronizing pulses, whereby the dropout portion of the reproduced signal does not trigger the vertical deflecting circuit.

3. In a video tape recorder wherein a reproducing head traverses a record tape and from time to time fails to reproduce a recorded signal thereby producing dropout portions in the reproduced signal, wherein the reproduced signal is a frequency modulated composite picture signal and wherein the reproduced signal is demodulated to recover the composite picture signal including the picture signal, horizontal synchronizing pulses, and vertical intervals including vertical synchronizing pulses extending from a blanking level for triggering a vertical deflecting circuit in a picture reproducing apparatus: the improvement comprising a dropout detector for producing dropout pulses of time and duration corresponding to respective dropout portions, and means coupled to said dropout detector and responsive to said dropout pulses for clamping the demodulated signal to a reference level for the duration of each of said dropout pulses, whereby the dropout portion of the reproduced signal does not trigger the vertical deflecting circuit.

4. In a video tape recorder wherein a reproducing head traverses a record tape and from time to time fails to reproduce a recorded signal thereby producing dropout portions in the reproduced signal, wherein the reproduced signal is a frequency modulated composite picture signal and wherein the reproduced signal is demodulated to recover the composite picture signal including the picture signal, horizontal synchronizing pulses, and vertical intervals including vertical synchronizing pulses extending from a blanking level for triggering a vertical deflecting circuit in a picture reproducing apparatus: a clamp circuit for preventing dropout-induced triggering of the vertical deflecting circuit which would result in vertical instability in the resultant picture, said clamp circuit comprising a dropout detector responsive to the reproduced signal to produce dropout pulses of time and duration corresponding to respective dropout portions, and means coupled to said dropout detector and responsive to said dropout pulses for clamping the demodulated signal to a grey level for the duration of each of said dropout pulses, whereby the dropout portion of the reproduced signal does not trigger the vertical deflecting circuit.

5. In a video tape recorder wherein a reproducing head traverses a record tape and from time to time fails to reproduce a recorded signal thereby producing dropout portions in the reproduced signal, wherein the reproduced signal is a frequency modulated composite picture signal and wherein the reproduced signal is demodulated to produce on a conductor the composite picture signal including the picture signal, horizontal synchronizing pulses, and vertical intervals including vertical synchronizing pulses extending from a blanking level for triggering a vertical deflecting circuit in a picture reproducing apparatus: a clamp circuit for preventing dropout-induced triggering of the vertical deflecting circuit which would result in vertical instability in the resultant picture, said clamp circuit comprising a dropout detector responsive to the reproduced signal to produce dropout pulses of time and duration corresponding to respective dropout portions, normally open switching means coupled between said conductor and ground and operating when closed to clamp said conductor to ground, said switching means including operating means coupled to said dropout detector and responsive to said dropout pulses to close said switching means for the duration of each of said dropout pulses, and means for disposing the grey level of said demodulated picture signal at ground level, whereby the dropout portion of the reproduced signal does not trigger the vertical deflecting circuit.

References Cited

UNITED STATES PATENTS 3,328,521 6/1967 Moskovitz --------- 178—6.6

ROBERT L. GRIFFITH, *Primary Examiner.*

H. W. BRITTON, *Assistant Examiner.*